United States Patent
Rouge et al.

(10) Patent No.: US 6,332,915 B1
(45) Date of Patent: Dec. 25, 2001

(54) PSA PLANT USING VALVES HAVING LONG AND HETEROGENEOUS OPERATING TIMES

(75) Inventors: Dominique Rouge, Malakoff; Stephane Chantagrel, Cruviers Lascours; Lian-Ming Sun, Palaiseau; Celine Graciannette, Versailles; Yves Torre, Magny Les Hameaux, all of (FR)

(73) Assignee: L'Air Liquide, Societe Anonyme pour l'Etude et l'Exploitation des Procedes Georges Claude

( * ) Notice: Subject to any disclaimer, the term of this patent is extended or adjusted under 35 U.S.C. 154(b) by 0 days.

(21) Appl. No.: 09/435,775

(22) Filed: Nov. 8, 1999

(30) Foreign Application Priority Data

Nov. 6, 1998 (FR) .................................................. 98 14026

(51) Int. Cl.⁷ .................................................. B01D 53/047
(52) U.S. Cl. .................................. 95/96; 95/130; 96/109; 96/130; 96/143
(58) Field of Search .................. 95/96–103, 130; 96/109–114, 130, 143, 144

(56) References Cited

U.S. PATENT DOCUMENTS

| | | | |
|---|---|---|---|
| 4,101,298 | * | 7/1978 | Myers et al. ..................... 96/130 X |
| 4,194,891 | * | 3/1980 | Earls et al. ........................ 96/130 X |
| 4,449,990 | * | 5/1984 | Tedford, Jr. ...................... 96/130 X |
| 4,512,781 | * | 4/1985 | Caralli et al. .................... 96/113 X |
| 4,877,429 | * | 10/1989 | Hunter ............................... 96/130 X |
| 5,122,164 | * | 6/1992 | Hirooka et al. ................... 96/130 X |
| 5,344,474 | * | 9/1994 | Null .................................... 96/130 X |
| 5,389,125 | * | 2/1995 | Thayer et al. .................... 96/130 X |

FOREIGN PATENT DOCUMENTS 2 053 020   2/1981   (GB).

* cited by examiner

*Primary Examiner*—Robert H. Spitzer
(74) *Attorney, Agent, or Firm*—Young & Thompson (57) ABSTRACT

A PSA, especially VSA, plant for separating a gas stream, operating in a production cycle and comprising at least one adsorber, preferably two or three adsorbers, and several valves having long and heterogeneous operating times. More specifically, the average operating time ($\mu$) of the valves is such that: $0.5 \text{ s} < \mu < 2 \text{ s}$ and the operating time ($\Delta t$) of each of the valves is such that: $\mu - x < \Delta t < \mu + x$, with $0.1 \text{ s} < x < 0.5 \text{ s}$. The invention also relates to the use of such a PSA plant for producing a gas stream rich in oxygen, in nitrogen or in hydrogen, particularly a stream comprising more than 80% oxygen, which is then sent to an oxygen-consuming plant chosen from a combustion furnace, a paper-pulp manufacturing unit and a water treatment unit.

14 Claims, 8 Drawing Sheets

PSA PLANT USING VALVES HAVING LONG AND HETEROGENEOUS OPERATING TIMES

FIELD OF THE INVENTION

The invention relates to a plant and a process of the PSA type, and more particularly of the VSA type, for separating a gas stream, in particular a gas stream containing essentially oxygen and nitrogen, such as air, using valves having long and heterogeneous operating times.

BACKGROUND OF THE INVENTION

The gases in air, such as especially oxygen and nitrogen, are of great industrial importance, especially in the fields of papermaking or glassmaking.

One of the non-cryogenic techniques used for producing these gases is the technique called "PSA" (standing for Pressure Swing Adsorption), which technique covers not only the strictly speaking PSA processes, but also the similar processes such as the VSA (Vacuum Swing Adsorption) and the MPSA (Mixed Pressure Swing Adsorption) processes.

According to this PSA technique, when the gas mixture to be separated is air and the component to be recovered is oxygen, the oxygen is separated from the gas mixture by means of preferential adsorption of at least the nitrogen on a material preferentially adsorbing at least nitrogen and subjected to given pressure cycles in the separation zone.

The oxygen, not being adsorbed or only slightly so, is recovered as output from the separation zone; in general, this has a purity greater than 90%, or even greater than 93%.

More generally, a PSA process for the non-cryogenic separation of a gas mixture comprising a first component that is preferentially adsorbed on an adsorbent material and a second component less preferentially adsorbed on the adsorbent material than the first component, for the purpose of producing the second component, comprises, in a cyclic manner:

- a step of preferential adsorption of at least the first component on the adsorbent material at an adsorption pressure called "high pressure", with recovery of at least some of the second component thus produced;
- a step of desorption of the first component, thus trapped by the adsorbent, at a desorption pressure below the adsorption pressure, called "low pressure";
- a step of recompression of the separation zone comprising the adsorbent, by going from the low pressure to the high pressure.

However, it is known that the efficiency of separation of a gas mixture, such as air, depends on many parameters, especially the high pressure, the low pressure, the type of adsorbent material used and the affinity of the latter for the components to be separated, the composition of the gas mixture to be separated, the adsorption temperature of the mixture to be separated, the size of the adsorbent particles, the composition of these particles and the temperature gradient established inside the bed of adsorbent.

Currently, zeolites are the adsorbents most used in PSA processes. The zeolite particles usually contain monovalent, divalent and/or trivalent metal cations, for example cations of alkali metals, alkaline-earth metals, transition metals and/or lanthanides, these cations being incorporated during the synthesis of the zeolite particles and/or inserted subsequently using an ion-exchange technique, that is to say, in general, by bringing the unexchanged or raw zeolite particles into contact with a solution of one or more metal salts comprising the cation or cations to be incorporated into the zeolitic structure and subsequently recovering the particles of exchanged zeolite, that is to say of zeolite containing a given amount of metal cations. By way of example, mention may be made of zeolites of type X or LSX (Low Silica X) containing more than 80%, or even more than 90%, of metal cations such as, especially, lithium, calcium and/or zinc cations.

Such zeolites are especially described in documents EP-A-486,384, EP-A-606,848, EP-A-589,391, EP-A-589,406, EP-A-548,755, U.S. Pat. No. -A-5,268,023, EP-A-109,063 and EP-A-760,248.

In theory, a PSA, especially VSA, process cycle is composed only of a well-defined succession of steps which completely define the gas streams at each instant of the cycle.

However, in practice these gas streams are organized by a sequence of valve opening and closing operations which are not, of course, instantaneous.

Thus, there are transient states during which certain parts of the plant carrying out the process are inopportunely placed in communication with each other.

This may, for example, be an unintentional inflow of air at the start of the oxygen recompression phase, which inflow then necessarily affects the overall performance of the process.

It will be understood that those skilled in the art have always tried to limit the extent of these transient states by limiting as far as possible, on an industrial scale, the opening and closing times of the valves in PSA or VSA units to a value generally less than approximately 0.5 seconds.

This requirement appears to be all the more important the shorter the durations of the steps of the pressure cycle.

Moreover, as soon as the process requires the use of a PSA or VSA unit having more than one adsorber, that is to say two or three adsorbers for example, too wide a distribution in the opening/closing times in the population of valves of the PSA or VSA unit may very easily create large imbalances in the process and very significantly degrade the performance.

It is therefore usual, when attempting to minimize or alleviate these problems, to try to obtain actuation times which are as homogeneous as possible over all the valves of the PSA unit.

Like the requirement for rapid operation, this requirement is particularly critical in the case of short cycles, that is to say cycles having a period of less than 60 seconds for example.

Hitherto, attempts have been made to satisfy these two conditions by seeking valves approaching systems with instantaneous or almost-instantaneous operation as close as possible.

Thus, document U.S. Pat. No. 4,360,362 proposes a PSA system employing very rapid valves and using a single pneumatic control so as to erase any heterogeneity in operating time.

Figure 1:
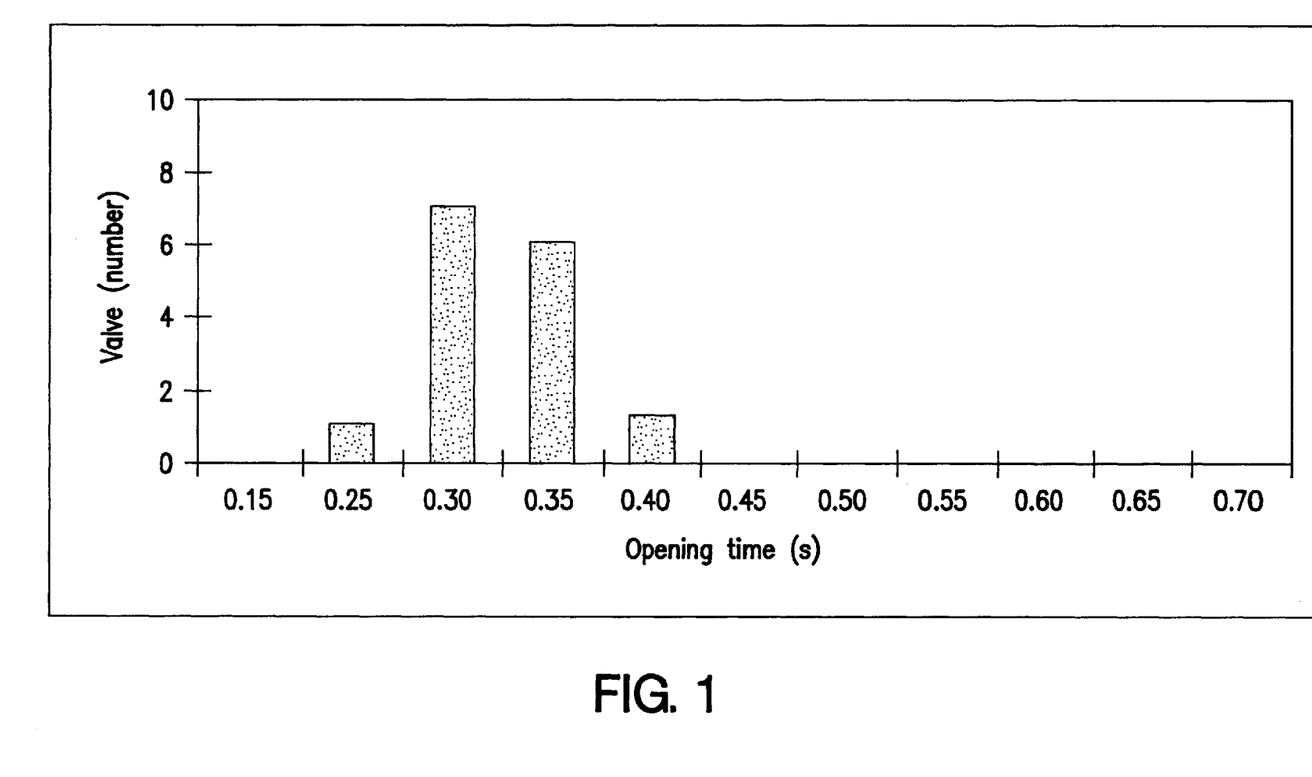
FIG. 1 is a bar graph depicting a conventional distribution in the opening and closing times of the valves in a VSA unit.

More generally, PSA or VSA units conventionally have a very narrow distribution in the operating times of the valves, around a very short average time, as shown schematically in FIG. 1 appended hereto, which shows a conventional distribution in the opening and closing times on a VSA unit.

In FIG. 1, it may be seen that, conventionally, the average opening/closing time of the valves is equal to approximately 0.3 s±0.1 s.

In order to avoid such undesirable gas transfer or flow during the changes in step of a PSA cycle, valve control systems have already been proposed, especially by document U.S. Pat. No. 4,322,228 which imposes a delay in the opening/closing commands, so as to actuate the valve which has to close before the one which has to open, the intended objective being here to completely eliminate any transient transfer.

However, this approach considerably affects the choice of valve technology to be employed in the VSA units.

Consequently, certain documents, such as the documents U.S. Pat. No. 4,877,429, JP-A-05,192,526 or GB-A-2,190,014, propose the use of novel valves, particularly valves employing rotary technology, making it possible to speed up the operating times compared with those of valves corresponding to more proven technologies, such as butterfly valves.

SUMMARY OF THE INVENTION

The object of the present invention is therefore to alleviate the abovementioned problems and to provide a PSA plant which is improved over that employing rapid valves, that is to say valves whose opening and closing times are as homogeneous as possible, as recommended by the prior art.

The present invention therefore relates to a PSA plant for separating a gas stream, operating in a production cycle and comprising at least one adsorber and several valves, characterized in that the average operating time ($\mu$) of the valves is such that:

$$0.5\ s \leq \mu < 2\ s$$

and the operating time ($\Delta t$) of each valve is such that:

$$\mu - x < \Delta t \leq \mu + x,\ \text{with}\ 0.1\ s \leq x < 0.5\ s.$$

However, it should be noted, in the context of the present invention, that there is no concern regarding possible ramping-up of the opening and/or closing times on all or some of the valves.

Unlike the teaching of the prior art, the present invention demonstrates that an industrial plant or unit employing a PSA, particularly VSA, process can easily be fitted with slower and less homogeneous valves than those recommended in the prior art.

In addition, according to the invention, the overall economic balance of the PSA process shows that there is quite an advantage in using such valves, which are less expensive, more reliable and last longer.

Depending on the case, the plant of the invention may comprise one or more of the following characteristics:

the average operating time ($\mu$) of the valves is such that:

$$0.5\ s \leq \mu < 1.5\ s,$$

preferably the average operating time ($\mu$) is such that:

$$0.5\ s \leq \mu < 1\ s;$$

$0.1\ s < x < 0.4\ s$, preferably $0.1\ s < x < 0.3\ s$;

it includes at least 3 valves, preferably at least 5 valves;

it includes at least two adsorbers, preferably two or three adsorbers;

it is of the VSA type;

it furthermore includes gas pipes;

it furthermore includes a system for controlling the operating times of the valves;

it furthermore includes a system for modifying the sequence of commands to operate the valves as a function of the operating times measured by the control system;

it is of the type with radial circulation of the gas and/or employs one or more adsorbents, for example a multibed process;

the gas stream to be separated comprises nitrogen and at least one less polar gas component, especially oxygen and/or hydrogen, and preferably the gas stream is air, the first gas component being nitrogen and the second gas component being oxygen, the air, in the context of the present invention, being the air contained inside a building or a heated or unheated enclosure, or is external air, that is to say under atmospheric conditions, taken as it is or possibly pretreated;

the first gas component is nitrogen and the second gas component is oxygen and an oxygen-rich gas stream, that is to say generally comprising at least 90% oxygen, is produced;

the high pressure for adsorption is between $10^5$ Pa and $10^7$ Pa, preferably of the order of $10^5$ Pa to $10^6$ Pa, and/or the low pressure of desorption is between $10^4$ Pa and $10^6$ Pa, preferably of the order of $10^4$ Pa to $10^5$ Pa;

the feed temperature is between 10° C. and 80° C., preferably between 250° C. and 60° C.

The present invention also relates to the use of a plant according to the invention to produce a gas stream comprising more than 50%, preferably more than 80%, of at least one gas chosen from the group formed by oxygen, nitrogen and hydrogen.

More specifically, the plant of the invention can be used to produce a gas stream comprising more than 80% oxygen, preferably more than 90% oxygen, the oxygen being sent to an oxygen-consuming plant chosen from a combustion furnace, a paper-pulp manufacturing unit and a water treatment unit.

BRIEF DESCRIPTION OF THE DRAWINGS

The invention will now be described in greater detail with the aid of examples given by way of illustration, but implying no limitation, and with reference to the appended figures, in which.

DESCRIPTION OF THE PREFERRED EMBODIMENTS

In general, the study presented below was carried out by dynamic simulation by means of a simulation program which is based on the principles of conservation of mass, conservation of enthalpy and conservation of momentum, and it uses the Linear Driving Force model (see D. M. Ruthven "Principles of Adsorption and Adsorption Processes", pages 242–243, John Wiley & Sons, 1984; or "Pressure Swing Adsorption", pages 58–61, VCS Publishers, 1994) for evaluating the kinetics of solid-gas transfer within the mass of adsorbent. Such simulation models are especially described in Ruthven, Farooq and Knaebel, "Pressure Swing Adsorption", pages 172–209, VCH Publishers, 1994; and in S. Ergun, "Fluid Flow Through Packed Columns", Chem. Engr. Prog., 48(2), 89 (1952). The equations can, for example, be solved by means of the DIVPAG program from the IMSL (International Mathematical & Statistical Library) and sold by Microsoft™, or by means of the ADSIM program sold by Aspentech™. Those skilled in the art are perfectly capable of choosing a suitable simulation program from the many programs available on the market and of inputting the above data into it. Should it be required, reference may also be made to the article by D. G. Hartzog and S. Sircar, "Sensitivity of PSA Process Performance to Input Variables", Adsorption, 1, 133–151 (1995), which describes a similar program.

For the purpose of simplification, the study presented below was carried out by assuming that the gas mixture to be separated is air, but the first component preferentially adsorbing on the adsorbent is nitrogen and that the second component adsorbing less preferentially on the adsorbent and having to be recovered is oxygen.

Furthermore, the study was carried out on two VSA-type systems or units, one having two adsorbers and the other having three adsorbers.

The first objective is to identify the sensitivity or the performance of the VSA unit to the distribution of the opening/closing times of the valves of the unit, so as, in a second step, to obtain the distributions most economically acceptable from an industrial standpoint.

EXAMPLE 1

VSA Unit having 2 Adsorbers and 10 Valves

Figure 2:
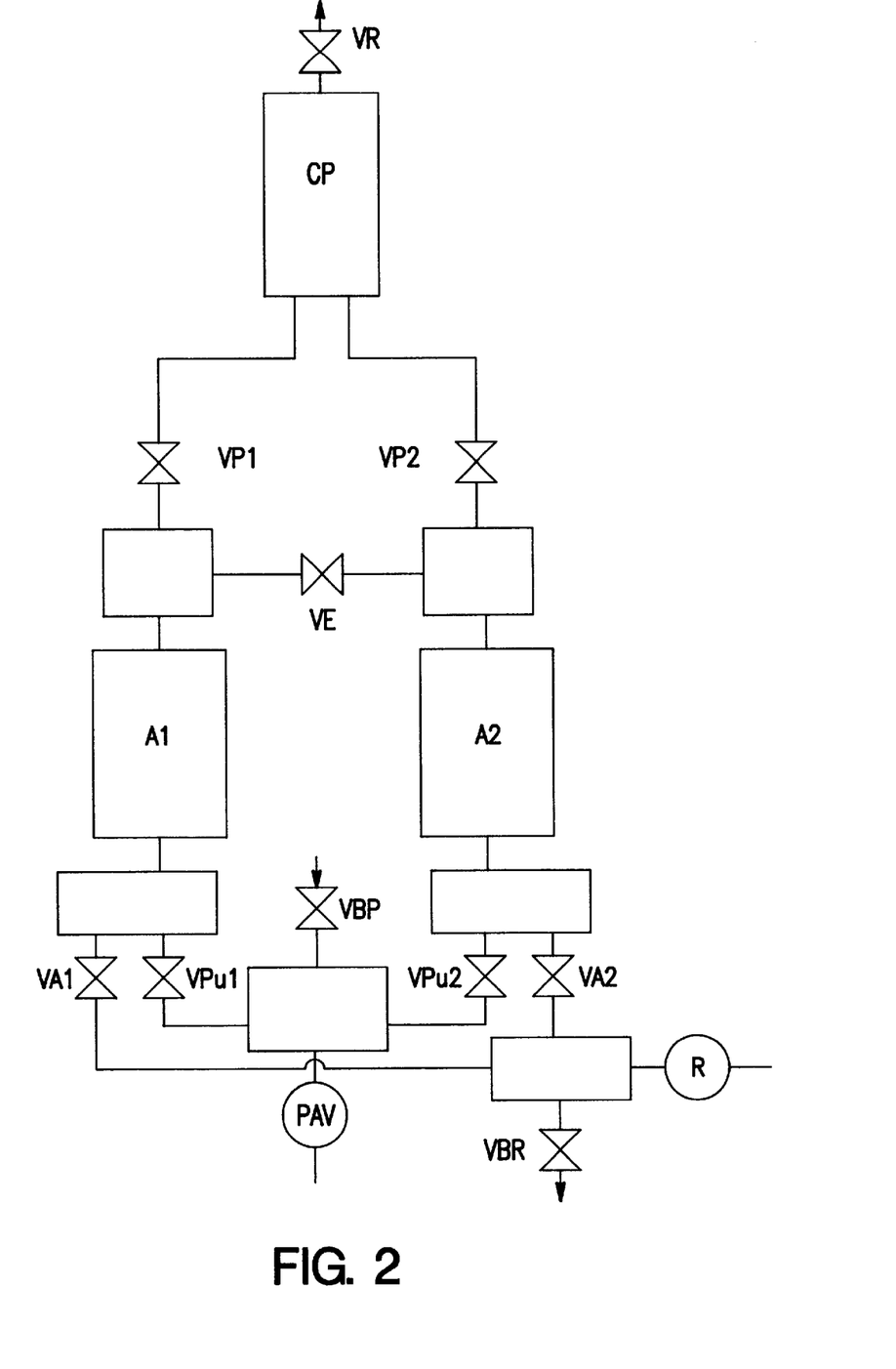
FIG. 2 depicts a modelled VSA system employing two adsorbers and ten valves.

In this example, the modelled VSA system employs two adsorbers A1, A2 and ten valves, as shown schematically in FIG. 2.

More specifically, this VSA system is illustrated in FIG. 2 and comprises:

2 adsorbers A1 and A2;

1 vacuum pump PAV;

1 air or Roots compressor R;

2 feed valves VA1 and VA2 controlling the inflow of air into the adsorbers A1 and A2, respectively;

2 production valves VP1 and VP2 controlling the outflow of gas (oxygen) from the adsorbers Al and A2, respectively, during the production phases;

2 purge valves VPU1 and VPU2 controlling the outflow of gas (nitrogen) from the adsorbers A1 and A2, respectively, during the purge phases;

1 balancing and elution valve VE;

1 network valve VR for communicating with the distribution network for the gas produced;

1 bypass valve VBP for by-passing the vacuum pump PAV;

1 bypass valve VBR for by-passing the compressor R; and a production tank CP.

Each of the 10 valves of the VSA system in FIG. 2 is characterized by opening and closing (O/C) times which constitute the parameters of the study.

Figure 3:
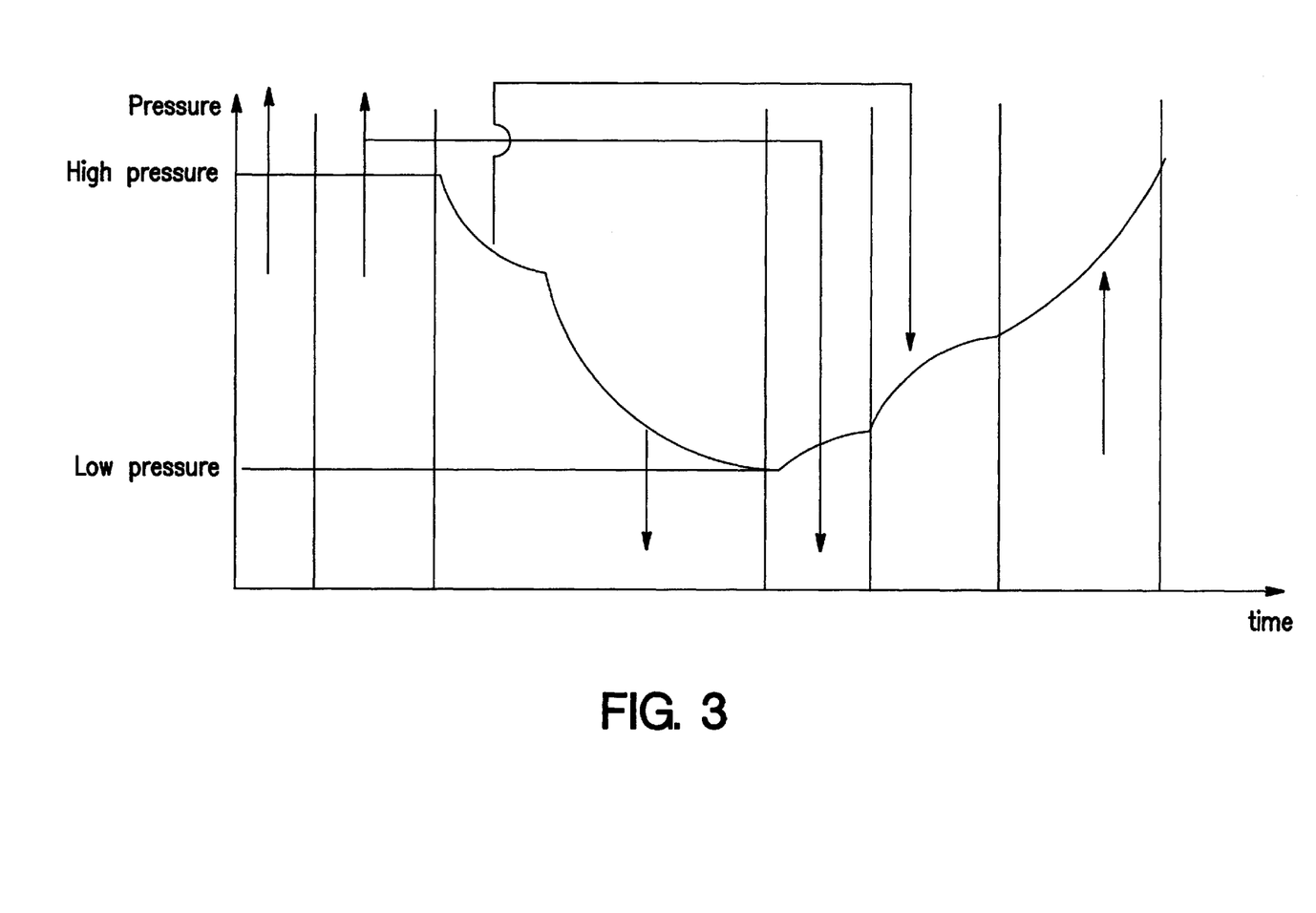
FIG. 3 illustrates the pressure variations between the high pressure and the low pressure of the cycle, and the gas streams entering and leaving each of the adsorbers of FIG. 2, over time.

The VSA system is subjected to the pressure cycle shown schematically in FIG. 3, which illustrates the variations in pressure (P) between the high pressure ($P_{high}$) of the cycle and the low pressure ($P_{low}$) of the cycle, and the gas streams entering and leaving each of the adsorbers A1 and A2, over time.

It goes without saying that the non-zero operating times of the valves affect the gas streams during transitions from one step to another.

A first series of simulations, having been carried out for a constant pressure cycle, made it possible to determine the possible latitude available when optimizing a cycle and establishing the design data for industrial units.

Thus, the performance of the VSA unit is unchanged up to an opening/closing (O/C) time of 2 s for a production cycle of 74 s, whereas the limit is at one second for a cycle of 40 s.

Figure 4:
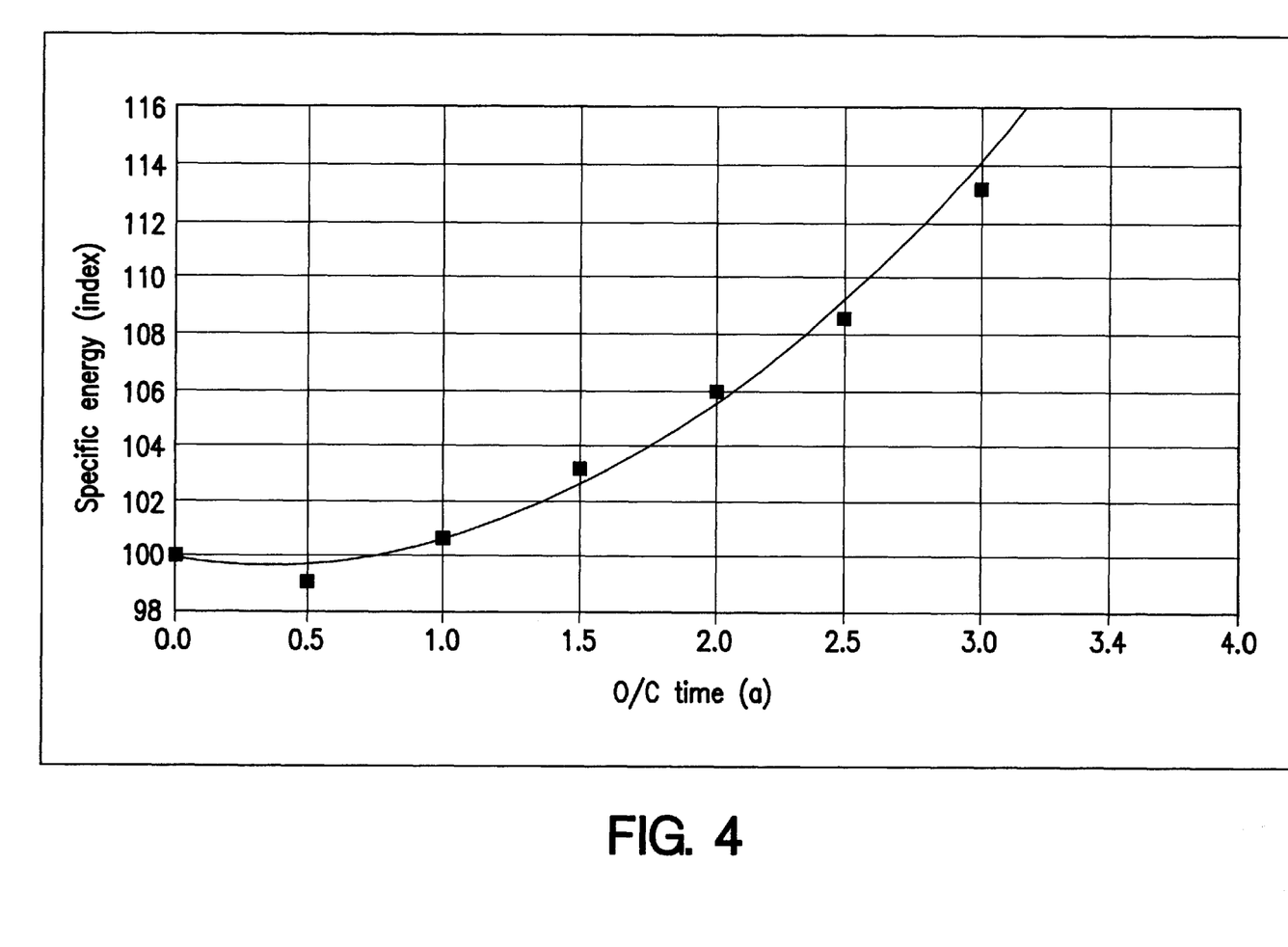
FIG. 4 illustrates the change in the specific energy, indexed to a given cycle, when the operating times vary in the case of a cycle of 40 s.

FIG. 4 illustrates, by way of example, the change in the specific energy (SE), indexed to a given cycle, when the operating times, that is to say the opening and/or closing (O/C) times, of the valves vary in the case of a cycle of 40 s.

This FIG. 4 makes it possible for the operator to optimize the cycle, depending on the case, to 0 s, 0.5 s or 1.0 s so as to provide, regardless of the case, the design data for any industrial unit.

However, at this stage, no "unbalanced" distribution in actuation times has been considered; this will be done below.

It is assumed now that the operator has performed a VSA unit design study for valves all having an opening/closing (O/C) time of the order of 0.5 s, but that the industrial unit thus designed will ultimately have a population of valves having longer and/or heterogeneous actuation times.

Such a VSA system of the type having given "machines and adsorbers" will be studied on the basis of the following assumptions:

design point of a 40 second cycle produced with valves actuating in 0.5 seconds; and industrial unit using valves having opening/closing times of 1 second ±0.5 second.

By considering all combinations, a priori the most unfavorable, that is to say those resulting in the most pronounced imbalances possible in the valves specific to each of the adsorbers or to an average actuation time longer than 1 second, it appears that, if the sequence of steps is not modified, the performance may be very greatly degraded, as is clearly shown by the results given in Table I below.

TABLE I

Impact of the distribution of O/C times on the performance of the VSA unit without modifying the sequence of valves Opening/closing time of the valves (in seconds)

| VA1/VA2 | VP1/VP2 | VPU1/VPU2 | VE | VBP | VBR | Production index | SE index |
|---|---|---|---|---|---|---|---|
| 0.5 | 0.5 | 0.5 | 0.5 | 0.5 | 0.5 | 100 | 100 |
| 1 | 1 | 1 | 1 | 1 | 1 | 97 | 102 |
| 1.5 | 1.5 | 1.5 | 1.5 | 1.5 | 1.5 | 98 | 104 |
| 1 | 1 | 0.5/1.5 | 1 | 1 | 1 | 88 | 114 |
| 1 | 1 | 1.5 | 1 | 1.5 | 1 | 95 | 105 |
| 0.5/1.5 | 1 | 1 | 1 | 1 | 1 | 95 | 105 |
| 1.5 | 1 | 1 | 1 | 1 | 1.5 | 97 | 104 |
| 1.5 | 1 | 1.5 | 1 | 1.5 | 1.5 | 95 | 106 |

TABLE I-continued

Impact of the distribution of O/C times on the performance of the VSA unit without modifying the sequence of valves Opening/closing time of the valves (in seconds)

| VA1/VA2 | VP1/VP2 | VPU1/VPU2 | VE | VBP | VBR | Production index | SE index |
|---|---|---|---|---|---|---|---|
| 1.5/0.5 | 1 | 0.5/1.5 | 1 | 1 | 1 | 82 | 121 |
| 0.5/1.5 | 1 | 0.5/1.5 | 1 | 1 | 1 | 96 | 105 |
| 1.5/0.5 | 0.5/1.5 | 0.5/1.5 | 1 | 1 | 1 | 81 | 124 |

It is apparent from Table I that the imbalance in the purge valves (VPU1 and VPU2) is particularly prejudicial.

The worst case seems to be that which combines the imbalances both in the purge valves (VPU1 and VPU2) and feed valves (VA1 and VA2), and between the purge valves (VPU1 or VPU2) and feed valves (VA1 or VA2) of the same adsorber (A1 or A2), given that undesirable gas transfer is then created, especially during the balancing step.

Figure 5:
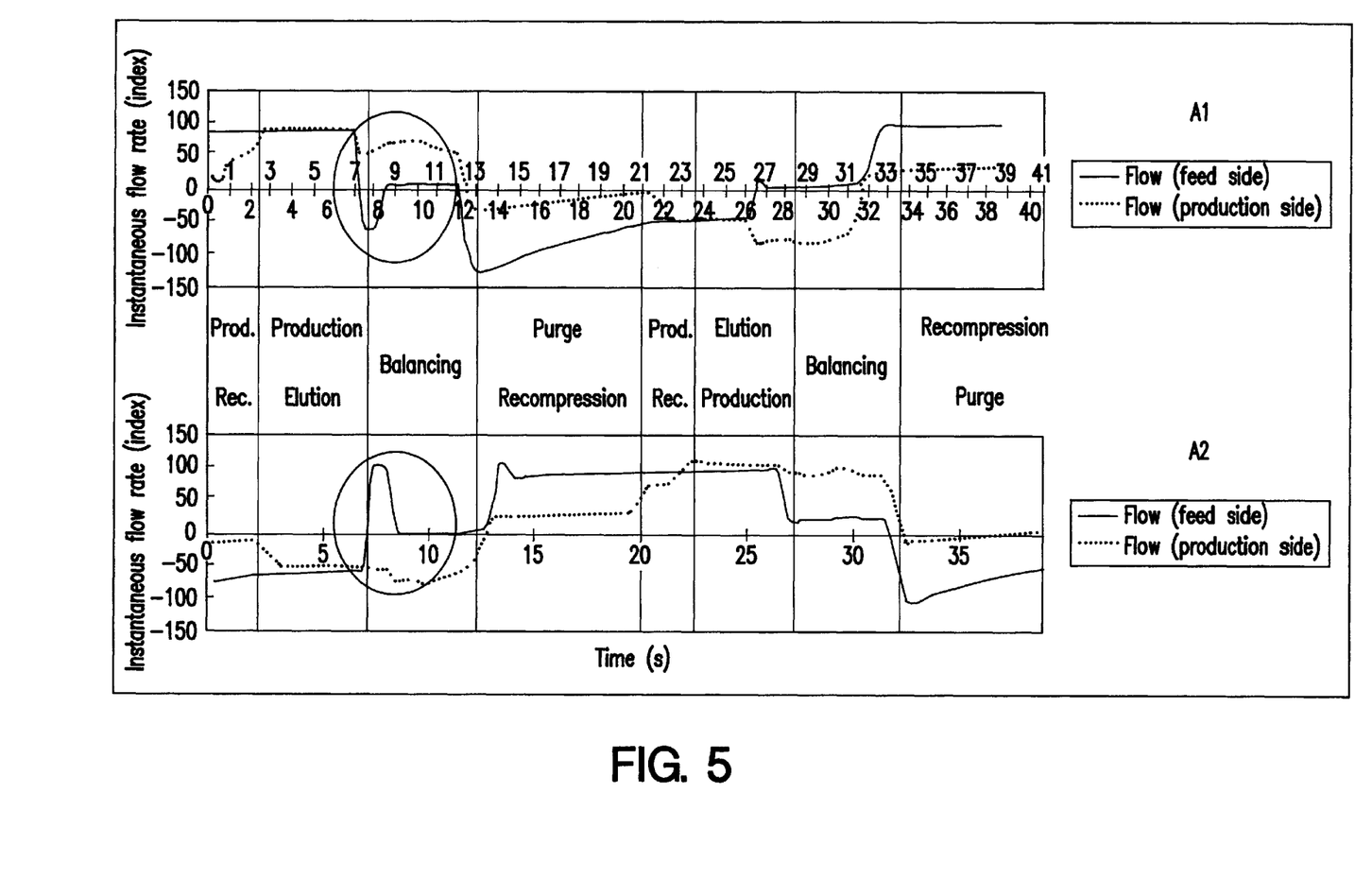
FIG. 5 schematically shows the impact of the distribution of opening and closing times of the valves on the instantaneous flow rates, for each phase of the cycle and for the two adsorbers.

FIG. 5 illustrates this phenomenon in each of the adsorbers A1 and A2 in the case in which an indexed specific energy (ES) of 121 (see Table I) is obtained, showing schematically the impact of the distribution of opening and closing (O/C) times of the valves on the instantaneous flow rates, for each phase of the cycle and for the two adsorbers A1 and A2.

The curves in FIG. 5 clearly show (circled areas) that the undesirable gas transfers generate imbalances prejudicial to the performance of the two-adsorber PSA unit:

However, it is possible, for each of the valve combinations, to circumvent these material-transfer perturbations by slightly modifying the opening/closing sequence of the valves.

Figure 6:
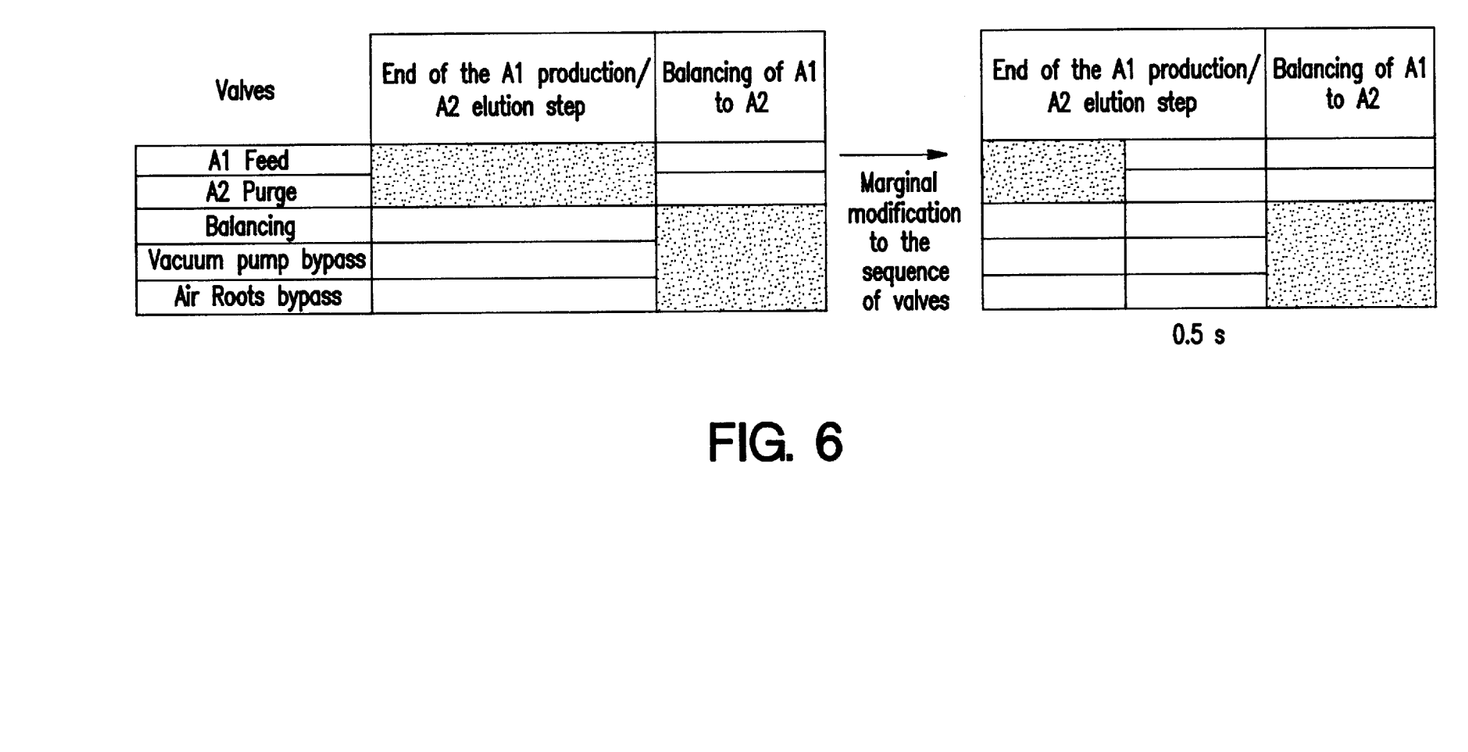
FIG. 6 is a schematic representation of the modification of sequence of valves.

Thus, still in the case considered above, the modification in the sequence of valves, shown schematically in FIG. 6, is enough to eliminate the undesirable transfers and to recover the balance of the pressure profiles and the expected performance of the unit.

More specifically, FIG. 6 extracts a detail, from the sequence of opening/closing commands given by the controller to the valves, corresponding to the end of the production/elution step and to the beginning of the balancing step.

The conventions used in this FIG. 6 are as follows: empty box/filled box transition= valve-opening command; filled box;/empty box transition=valve-closing command.

Thus, the proposed modification then consists in anticipating the command to open the valves which must normally be closed at the end of the production/elution step.

However, it should be noted that, in this case, given the significant delay in closing the feed valves of the adsorber A1 and the purge valve of the adsorber A2, no pressure peak appears at the intake of the vacuum pump PAV and at the delivery of the air for Roots compressor R, which guarantees operating safety and constancy of the specific energy (SE).

TABLE II

Impact of the distribution of O/C times on the performance of the VSA unit with modification of the sequence of valves Opening/closing time of the valves (in seconds)

| VA1/VA2 | VP1/VP2 | VPU1/VPU2 | VE | VBP | VBR | Production index | SE index |
|---|---|---|---|---|---|---|---|
| 0.5 | 0.5 | 0.5 | 0.5 | 0.5 | 0.5 | 100 | 100 |
| 1.5/0.5 | 1 | 0.5/1.5 | 1 | 1 | 1 | 98 | 99 |
| 0.5/1.5 | 1 | 0.5/1.5 | 1 | 1 | 1 | 100 | 99 |
| 1.5/0.5 | 0.5/1.5 | 0.5/1.5 | 1 | 1 | 1 | 99 | 99 |

It is apparent from Table II that a simple adjustment in the controller at start-up of the unit is all that is required to take a heterogeneous distribution in O/C times into account.

Thus it may be shown that the performance may be maintained as long as the O/C times of the valves remain within the range [$\mu$–0.5 s; $\mu$+0.5 s], with $\mu$ denoting the average value of the time in question and $\mu$ being between 0.5 s and 1.5 s.

EXAMPLE 2

VSA Unit Having Three Adsorbers and Fourteen Valves

The previous study was also carried out on a system having 3 adsorbers, in which the risk of a perturbation in the cycle by singular actuation times on each adsorber is even greater.

Figure 7:
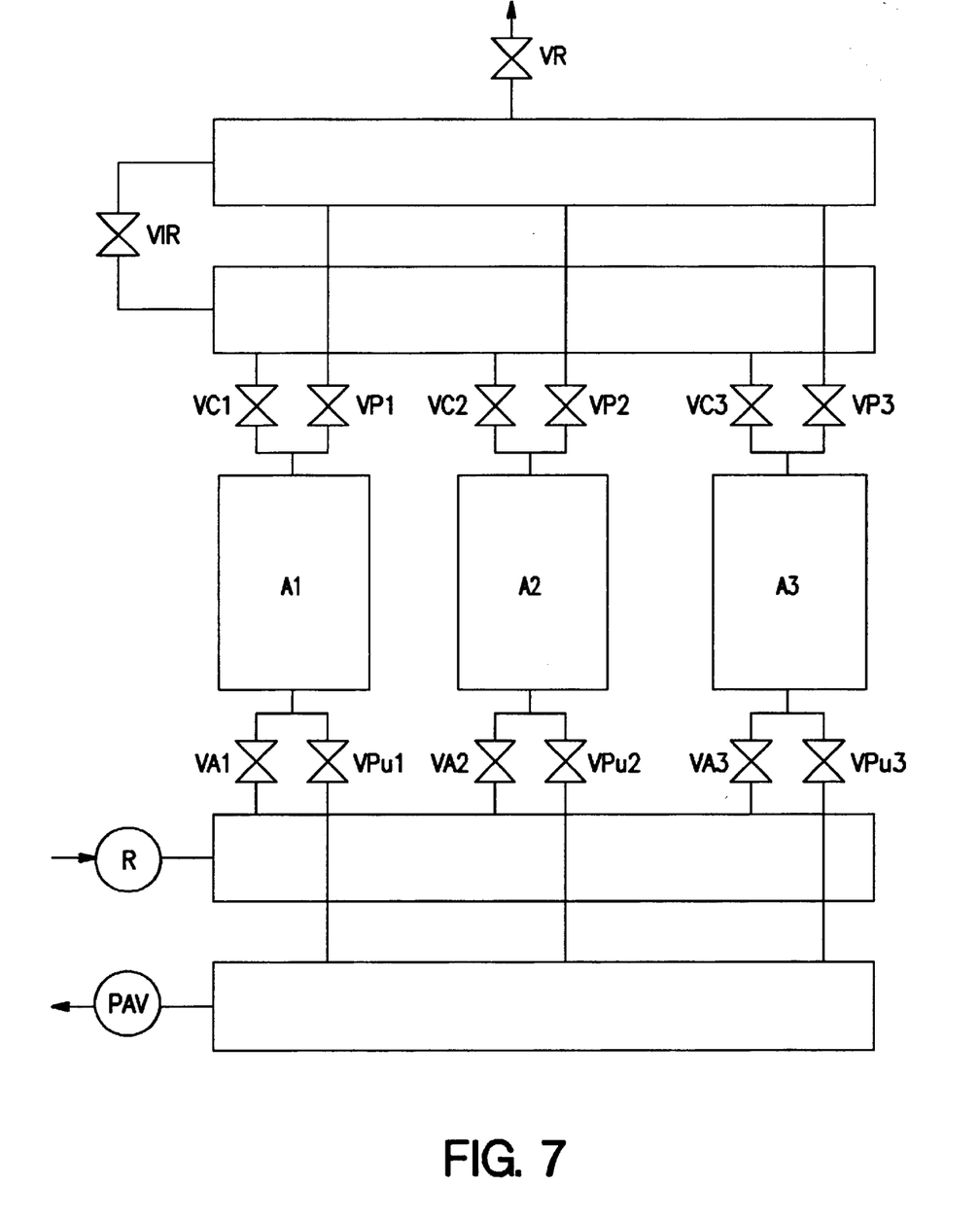
FIG. 7 depicts a modelled VSA system employing three adsorbers and fourteen valves.

The VSA system modelled and illustrated in FIG. 7 comprises:

3 adsorbers A1, A2 and A3;

1 vacuum pump PAV;

1 air or "blowing" compressor S;

3 feed valves VA1, VA2 and VA3 controlling the inflow of air into the adsorbers A1, A2 and A3, respectively;

3 production valves VP1, VP2 and VP3 controlling the outflow of gas (oxygen) from the adsorbers A1, A2 and A3, respectively, during the production phases;

3 purge valves VPU1, VPU2 and VPU3 controlling the outflow of gas (nitrogen) from the adsorbers A1, A2 and A3, respectively, during the purge phases;

3 recompression valves VC1, VC2 and VC3 controlling the recompression of the adsorbers A1, A2 and A3, respectively, during the recompression phases;

1 intermediate recompression valve VIR;

1 network valve VR for communication with the distribution network for the gas produced.

Each of the fourteen valves of the VSA system in FIG. 7 is characterized by opening and closing (O/C) times which constitute the parameters of the study.

Figure 8:
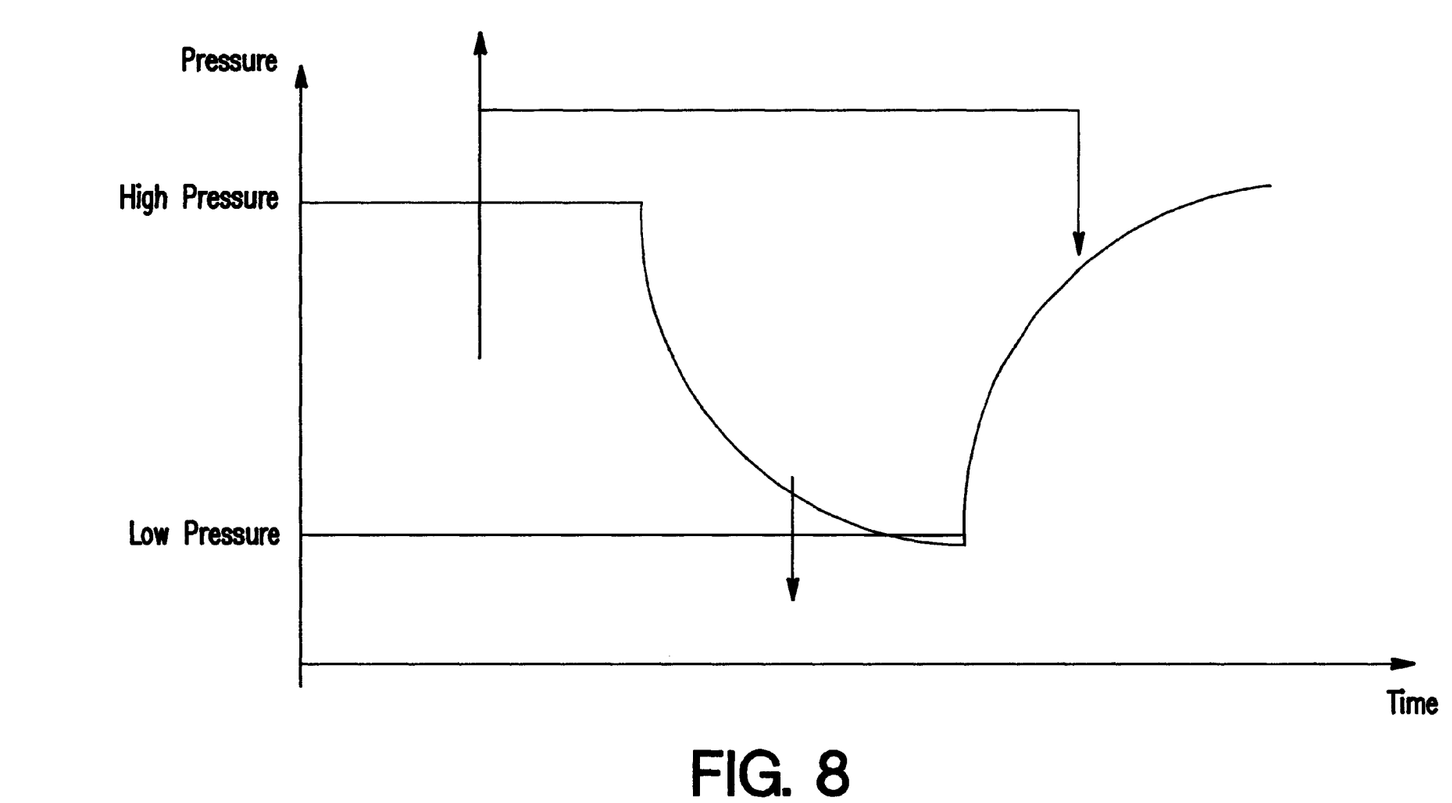
FIG. 8 illustrates the pressure-variations between the high pressure and the low pressure of the cycle, and the gas streams entering and leaving each of the adsorbers of FIG. 7, over time.

The VSA system is subjected to the pressure cycle shown schematically in FIG. 8, which illustrates the variations in pressure (P) between the high pressure ($P_{high}$) of the cycle and the low pressure ($P_{low}$) of the cycle, and the gas streams entering and leaving each of the adsorbers A1, A2 and A3, over time.

The function of the relatively complex system of valves, shown schematically in FIG. 7 on the production side, is merely to allow, by successive openings, progressive recompression by the production gas without the use of regulator-controlled valves.

This is because the regulators controlling the valve actuators are often a cause of unreliability in VSA units.

As in the case of Example 1 relating to a two-adsorber VSA unit, the conclusions of the simulations carried out with a constant cycle clearly show that the performance is not significantly altered by using relatively slow valves.

For example, for a 45 second cycle, the performance remains very comparable as long as the opening or closing of the valves does not exceed 1 s.

At this stage, the simulations were done with a constant cycle, without any modification to the opening/closing sequence of the valves of the system.

As previously, it is appropriate now to try to identify the consequences of using valves taken from a population having heterogeneous opening/closing times and an average value greater than that of the design point of the VSA unit.

Here again, it may be shown that a minor modification to the sequence of the valves makes it possible to compensate, almost entirely, for the loss of performance as a result of a "poor" distribution of valves.

This modification to the sequence relies, here again, on anticipation, during the step in question, of the opening and/or closing of the "unbalanced" valves so as to eliminate any inopportune material transfer between adsorbers.

Tables III and IV below present cases in which a critical distribution in the purge valves, to which the performance is very sensitive (as in the case of the two-adsorber system), which distribution is completely compensated for by modifying the sequence of the valves (Table IV) based on the principle in FIG. 6.

Moreover, the greater latitude in the distribution of opening/closing times specified to the valve supplier reduces the cost of the valves since production control can be simplified.

Thus, increasing the actuation times and the latitude in the distribution of these times makes it possible, on the one hand, for the reliability of the unit to be increased and the investment to be reduced and, on the other hand, for the performance to be degraded significantly only above certain values, greater than 1.5 s and ±0.5 s, respectively.

This approach makes it possible to obtain the best economic compromise, achieved in the case of valves taken from a population having an average opening/closing time p of between 0.5 s and 2 s, and a distribution of opening/closing times of between $[\mu-0.2$ s; $\mu+0.2$ s] and $[\mu-0.5$ s; $\mu+0.5$ s].

The present invention is not limited to the field of oxygen production from air and can therefore, consequently, be applied to the separation of other gas streams, such as especially streams containing hydrogen, carbon dioxide and/or carbon monoxide, in particular to the production of synthesis gas or "syngas".

TABLE III

Impact of the distribution in O/C times on the performance of the VSA unit without modification to the sequence of valves

| Opening/closing time of the valves (in seconds) | | | | Production | Specific |
| --- | --- | --- | --- | --- | --- |
| VA1/VA2/VA3 | VPU1/VPU2/VPU3 | VP1/VP2/VP3 | VC1/VC2/VC3 | index | energy index |
| 0.5/0.5/0.5 | 0.5/0.5/0.5 | 0.5/0.5/0.5 | 0.5/0.5/0.5 | 100 | 100 |
| 1/1/1 | 0.5/1/1.5 | 1/1/1 | 1/1/1 | 87 | 117 |

TABLE IV

Impact of the distribution of O/C times on the performance of the VSA unit with modification to the sequence of valves

| Opening/closing time of the valves (in seconds) | | | | Production | Specific |
| --- | --- | --- | --- | --- | --- |
| VA1/VA2/VA3 | VPU1/VPU2/VPU3 | VP1/VP2/VP3 | VC1/VC2/VC3 | index | energy index |
| 0.5/0.5/0.5 | 0.5/0.5/0.5 | 0.5/0.5/0.5 | 0.5/0.5/0.5 | 100 | 100 |
| 1/1/1 | 0.5/1/1.5 | 1/1/1 | 1/1/1 | 99 | 101 |

It is apparent that the conclusions are the same as for the two-adsorber device, namely that the performance can be maintained as long as the O/C times of the valves remain within the range $[\mu-0.5$ s; $\mu+0.5$ s], with $\mu$ denoting the average value of the time in question and being between 0.5 s and 1.5 s.

The above examples show that the choice of valves may be made with a degree of latitude and that, surprisingly, it is possible to use valves guaranteeing only opening/closing times which are slow (up to 1.5 s), and very heterogeneous (±0.5 s), while at the same time maintaining acceptable performance from the industrial standpoint.

In other words, by simply adjusting the controller, the heterogeneity of the valves may be of no consequence on the performance of the VSA unit.

Furthermore the use of slower valves makes it possible to improve the lifetime of the valves, which represent a major source of unreliability in a VSA unit.

Consequently, "softer" actuation of the mechanical parts used for opening/closing the valve reduce, of course, the risks of these mechanisms failing.

What is claimed is:

1. Method of separating a gas mixture, which comprises:
   providing a PSA plant operating in a production cycle, and comprising at least one adsorber and several valves, each valve having an operating time;
   supplying to said plant said gas mixture to be separated so as to produce a gas stream comprising more than 50% of at least one gas selected from the group consisting of oxygen, nitrogen and hydrogen; and
   wherein the average operating time of the valves is such that $0.5$ s$\leq \mu < 2$ s and the operating time ($\Delta t$) of each valve is such that:

$\mu-x < \Delta t \leq \mu+x$, with $0.1$ s$<x<0.5$ s; and the operating times ($\Delta t$) of at least two of said valves being not equal.

2. The method according to claim 1, wherein said gas stream comprises more than 80% oxygen, and said oxygen is sent to an oxygen-consuming plant chosen from a combustion furnace, a paper pulp manufacturing unit and a water treatment unit.

3. PSA plant for separating a gas stream, operating in a production cycle and comprising at least one adsorber and several valves, each valve having an operating time, wherein the average operating time ($\mu$) of the valves is such that:

$$0.5 \text{ s} < \mu < 2 \text{ s}$$

and the operating time ($\Delta t$) of each valve is such that:

$$\mu - x < \Delta t < \mu + x, \text{ with } 0.1 \text{ s} < x < 0.5 \text{ s};$$

and the operating times ($\Delta t$) of at least two of said valves being not equal.

4. The plant according to claim 3, wherein the average operating time ($\mu$) of the valves is such that $0.5 \text{ s} < \mu < 1.5 \text{ s}$.

5. The plant according to claim 4, wherein the average operating time ($\mu$) of the valves is such that $0.5 \text{ s} < \mu < 1 \text{ S}$.

6. The plant according to claim 3, wherein $0.1 \text{ s} < x < 0.4 \text{ s}$.

7. The plant according to claim 6, wherein $0.1 \text{ s} < x < 0.3 \text{ s}$.

8. The plant according to claim 3, wherein the several valves comprise at least three valves.

9. The plant according to claim 3, wherein the several valves comprise at least five valves.

10. The plant according to claim 3, wherein said at least one adsorber comprises at least two adsorbers.

11. The plant according to claim 3, wherein said at least one adsorber comprises three adsorbers.

12. The plant according to claim 3, wherein the plant is a VSA plant.

13. The plant according to claim 3, further comprising a control system for controlling the operating time of each valve.

14. The plant according to claim 13, further comprising a system for modifying a sequence of commands to operate the valves as a function of the operating times measured by the control system.

* * * * *